(12) United States Patent
Suzuki et al.

(10) Patent No.: US 7,738,507 B2
(45) Date of Patent: Jun. 15, 2010

(54) NETWORK RELAY SYSTEM AND CONTROL METHOD THEREOF

(75) Inventors: Masashi Suzuki, Yokohama (JP); Manabu Fujita, Hadano (JP); Hiroyuki Isogai, Hadano (JP); Shinji Nozaki, Sagamihara (JP)

(73) Assignees: Hitachi, Ltd., Tokyo (JP); Hitachi Hybrid Network Co., Ltd., Kanagawa (JP)

( * ) Notice: Subject to any disclaimer, the term of this patent is extended or adjusted under 35 U.S.C. 154(b) by 89 days.

(21) Appl. No.: 12/234,174

(22) Filed: Sep. 19, 2008

(65) Prior Publication Data

US 2009/0016383 A1  Jan. 15, 2009

Related U.S. Application Data

(63) Continuation of application No. 10/867,220, filed on Jun. 15, 2004, now abandoned.

(30) Foreign Application Priority Data

Jun. 1, 2004  (JP)  ............................ 2004-163389

(51) Int. Cl.
*H04J 3/06* (2006.01)
(52) U.S. Cl. ...................................... 370/509; 370/537
(58) Field of Classification Search ........................ None
See application file for complete search history.

(56) References Cited

U.S. PATENT DOCUMENTS

| 4,451,916 A | | 5/1984 | Casper et al. | |
| 5,060,229 A | * | 10/1991 | Tyrrell et al. | 370/522 |
| 5,473,599 A | | 12/1995 | Li et al. | |

(Continued)

FOREIGN PATENT DOCUMENTS

JP  2002-26909  1/2002

OTHER PUBLICATIONS

Otto I. Szentesi, "Field Experience with Fiber-optic Cable Installation, Splicing, Reliability, and Maintenance", IEEE Journal on Selected Areas in Communications, Apr. 1983, pp. 541-546, Vp;/ SAC-1 No. 3.

*Primary Examiner*—Jayanti K Patel
*Assistant Examiner*—Hooman Houshmand
(74) *Attorney, Agent, or Firm*—McDermott Will & Emery LLP

(57) ABSTRACT

The network relay device of the invention carries out data transmission to and from an opposite device to relay data in a network. The network relay device includes: multiple ports connecting with corresponding multiple ports of the opposite device via multiple links; and a link aggregation control module that aggregates the multiple links to establish a link aggregation, which is regarded as one logic link, and carries out transmission of a control frame signal including a synchronization bit, as well as data transmission, at each port via the link aggregation. In response to detection of occurrence of a trouble in at least one of the aggregated multiple links, the link aggregation control module causes a port that connects with a normal link without the trouble among the multiple ports to stop the data transmission and send the control frame signal including the synchronization bit set equal to a first value. Here the first value functions to stop the data transmission at a corresponding port of the opposite device connecting with the normal link.

12 Claims, 6 Drawing Sheets

U.S. PATENT DOCUMENTS

| | | | |
|---|---|---|---|
| 5,955,959 A * | 9/1999 | Taki et al. .................... 340/3.2 |
| 5,959,968 A | 9/1999 | Chin et al. |
| 5,982,745 A | 11/1999 | Wolff et al. |
| 6,532,212 B1 | 3/2003 | Soloway et al. |
| 6,870,838 B2 * | 3/2005 | Dally ........................ 370/369 |
| 7,061,858 B1 * | 6/2006 | Di Benedetto et al. ...... 370/219 |
| 7,139,291 B2 * | 11/2006 | Arbel et al. .................. 370/537 |
| 7,139,928 B1 * | 11/2006 | Bhattacharya et al. ......... 714/4 |
| 2003/0193891 A1 | 10/2003 | Chen et al. |
| 2004/0081081 A1 | 4/2004 | Colombo |
| 2005/0041654 A1 | 2/2005 | Lee |

\* cited by examiner

NETWORK RELAY SYSTEM AND CONTROL METHOD THEREOF

RELATED APPLICATIONS

This application is a Continuation of U.S. application Ser. No. 10/867,220, filed Jun. 15, 2004 now abandoned, claiming priority of Japanese Application No. 2004-163389, filed Jun. 1, 2004, the entire contents of each of which are hereby incorporated by reference.

BACKGROUND OF THE INVENTION

1. Field of the Invention

The present invention relates to a network relay device that carries out data transmission to and from an opposite device, so as to relay data in a network.

2. Description of the Related Art

A switch as one of network relay devices may be designed to have the function of link aggregation, which connects with another switch by multiple links (multiple physical lines) and aggregates the multiple links as one logic link.

One known example of the link aggregation is disclosed in Japanese Patent Laid-Open Gazette No. 2002-26909.

The bandwidth of the logic link is the total of the individual bandwidths of the aggregated multiple links. The link aggregation thus advantageously expands the bandwidth. Even in the case of the occurrence of a trouble or failure in some of the aggregated multiple links, the link aggregation adopts a degenerate mode to continue communication via the remaining normal links and accordingly assures the redundancy.

This prior art technique, however, has the following problems with regard to the redundancy of the link aggregation.

In the case of the occurrence of a trouble in some of the aggregated multiple links, the degenerate mode establishes communication by only normal links and thus undesirably reduces the total bandwidth by the bandwidth of the link with the trouble. This prior art technique continues communication with the undesirable reduced bandwidth, while assuring the redundancy.

Another possible measure to assure the redundancy in the case of the occurrence of a trouble changes the communication path of the network to bypass the link with the trouble.

Application of this measure to the technique of link aggregation establishes two or more link aggregations in one switch and specifies one of the multiple link aggregations as active to establish communication via aggregated multiple links of the active link aggregation. In response to the occurrence of a trouble or failure in some of the aggregated multiple links in the currently active link aggregation, the method of this measure stops the currently active link aggregation and makes a standby link aggregation active.

In the case where a trouble or failure arises in some of the aggregated multiple links in the currently active link aggregation, restraint of the degenerate mode and stop of data transmission via the aggregated links are required to effect a switchover to the standby link aggregation.

This problems is not restricted to the switches as one of the network relay devices but is also found in other network relay devices having the function of link aggregation, for example, routers.

SUMMARY OF THE INVENTION

The object of the invention is thus to eliminate the drawbacks of the prior art technique and provide a technique of restraining a degenerate mode and stopping data transmission via aggregated multiple links, in the case of the occurrence of a trouble or failure in at least one of the aggregated multiple links.

In order to attain at least part of the above and the other related objects, the present invention is directed to a first network relay device that carries out data transmission to and from an opposite device to relay data in a network. The first network relay device includes: multiple ports connecting with corresponding multiple ports of the opposite device via multiple links; and a link aggregation control module that aggregates the multiple links to establish a link aggregation, which is regarded as one logic link, and carries out transmission of a control frame signal including a synchronization bit, as well as data transmission, at each port via the link aggregation. In response to detection of occurrence of a trouble in at least one of the aggregated multiple links, the link aggregation control module causes a port that connects with a normal link without the trouble among the multiple ports to stop the data transmission and send the control frame signal including the synchronization bit set equal to a first value. Here the first value functions to stop the data transmission at a corresponding port of the opposite device connecting with the normal link.

In response to the occurrence of a trouble or failure in at least one of the aggregated multiple links, the first network relay device of the invention causes the port connecting with the normal link without the trouble to stop the data transmission and to send the control frame signal including the synchronization bit set equal to the first value. The corresponding port of the opposite device stops the data transmission, in response to reception of the synchronization bit equal to the first value.

The first network relay device of the invention thus effectively restrains the degenerate mode and stops the data transmission via the aggregated multiple links, in the case of the occurrence of a trouble or failure in at least one of the aggregated multiple links.

In one preferable embodiment of the first network relay device of the invention, the link aggregation control module causes at least the port connecting with the normal link to send the control frame signal including the synchronization bit set equal to a second value, which is different from the first value, in the case of recovery of the at least one link from the trouble. Here the second value functions to start the data transmission at the corresponding port of the opposite device connecting with the normal link.

The first network relay device of this embodiment causes at least the port connecting with the normal link to send the control frame signal including the synchronization bit set equal to the second value. The corresponding port of the opposite device thus resumes the data transmission, in response to reception of the synchronization bit equal to the second value.

In another preferable embodiment of the first network relay device of the invention, the link aggregation control module causes at least the port connecting with the normal link to send the control frame signal including the synchronization bit set equal to a second value, which is different from the first value, when the trouble in the at least one link has been fixed and when all the multiple ports have received the control frame signal including the synchronization bit, which is set equal to a value representing a start standby state of the data transmission, from respective corresponding ports of the opposite device. Here the second value functions to start the data transmission at the corresponding port of the opposite device connecting with the normal link.

In the case where all the multiple ports have received the control frame signal including the synchronization bit set equal to the value representing the start standby state of the data transmission from the respective corresponding ports of the opposite device, it is confirmed that no trouble or failure arises in the opposite device and that all the corresponding ports of the opposite device can start the data transmission any time. The first network relay device of this arrangement causes the corresponding port of the opposite device to resume the data transmission, after such confirmation.

In the first network relay device of the above embodiment, it is preferable that the link aggregation control module starts the data transmission at the port that has sent the control frame signal including the synchronization bit set equal to the second value, in response to reception of the control frame signal including the synchronization bit, which is set equal to a value representing either of a start standby state and a start of the data transmission, from the corresponding port of the opposite device.

This arrangement enables the first network relay device to resume the data transmission, simultaneously with the opposite device.

The invention is also directed to a second network relay device that carries out data transmission to and from an opposite device to relay data in a network. The second network relay device includes: multiple ports connecting with corresponding multiple ports of the opposite device via multiple links; and a link aggregation control module that aggregates the multiple links to establish a link aggregation, which is regarded as one logic link, and carries out transmission of a control frame signal including a synchronization bit, as well as data transmission, at each port via the link aggregation.

The link aggregation control module allows each of the multiple ports to take one of first through fourth states as an operating state. The link aggregation control module causes the port set in the first state to carry out data transmission, as well as transmission of the control frame signal, where the control frame signal sent from the port in the first state includes the synchronization bit set equal to a value '1'. The link aggregation control module causes the port set in either of the second state and the third state to carry out transmission of only the control frame signal, where the control frame signal sent from the port in either of the second state and the third state includes the synchronization bit set equal to a value '0'. The link aggregation control module causes the port set in the fourth state to carry out transmission of only the control frame signal, where the control frame signal sent from the port in the fourth state includes the synchronization bit set equal to the value '1'.

The link aggregation control module allows for a transition of the operating state from the first state to the second state, in response to detection of occurrence of a trouble in a link other than a link connecting with the port in the first state, among the aggregated multiple links. The link aggregation control module allows for a transition of the operating state from the second state to the third state, when the port in the second state receives the control frame signal from a corresponding port of the opposite device. The link aggregation control module allows for a transition of the operating state from the third state to the fourth state, in response to recovery of the link from the trouble. The link aggregation control module allows for a transition of the operating state from the fourth state to the first state, when the port in the fourth state receives the control frame signal including the synchronization bit set equal to 1 from a corresponding port of the opposite device. The link aggregation control module allows for a transition of the operating state from the first state to the fourth state, when the port in the first state receives the control frame signal including the synchronization bit set equal to 0 from a corresponding port of the opposite device.

In response to the occurrence of a trouble or failure in at least one of the aggregated multiple links, the second network relay device of the invention causes the port connecting with the normal link without the trouble to change the operating state from the first state to the second state. The port in the second state stops the data transmission and sends the control frame signal including the synchronization bit set equal to 0 to the opposite device, in order to stop the data transmission at the corresponding port of the opposite device. The second network relay device of the invention thus effectively restrains the degenerate mode and stops the data transmission via the aggregated multiple links, in the case of the occurrence of a trouble or failure in at least one of the aggregated multiple links.

In one preferable embodiment of the second network relay device of the invention, the link aggregation control module allows for the transition of the operating state from the third state to the fourth state, when the trouble has been fixed in the link and when all the multiple ports have received the control frame signal including the synchronization bit set equal to 1 from respective corresponding ports of the opposite device.

One of the conditions for the transition of the operating state from the third state to the fourth state is that all the multiple ports have received the synchronization bit set equal to 1. The operating state is changed from the third state to the fourth state, after confirmation that the operating state is in an 'aggregation standby' state (equivalent to the fourth state) at all the ports of the opposite device, which is in conformity with IEEE (Institute of Electrical and Electronic Engineers) 802.3. This arrangement starts data transmission after confirmation of successful aggregation of all multiple target links, thus ensuring connection with a desired bandwidth.

In any of the network relay devices of the invention, it is preferable that the opposite device is a network relay device in conformity with IEEE 802.3.

The network relay device in conformity with IEEE 802.3 is designed to stop data transmission via the link connecting with a port, which receives the synchronization bit equal to 0. Setting 0 to the first value thus stops the data transmission at the corresponding port of the opposite device.

The network relay device of the invention may be constructed as a switch or as a router.

The technique of the invention is not restricted to the network relay device described above but is also applicable to a control method of such a network relay device. The invention may be actualized by diversity of other applications, for example, computer programs to attain the network relay device and its control method, recording media in which such computer programs are recorded, and data signals that include such computer programs and are embodied in carrier waves.

DESCRIPTION OF THE PREFERRED EMBODIMENTS

One mode of carrying out the invention is discussed below as a preferred embodiment in the following sequence:

A. Configuration of Embodiment

B. Connection

C. Drawbacks of Prior Art and Principles of Embodiment

D. Operations of Embodiment

E. Effects of Embodiment

F. Modifications

A. Configuration of Embodiment

Figure 1:
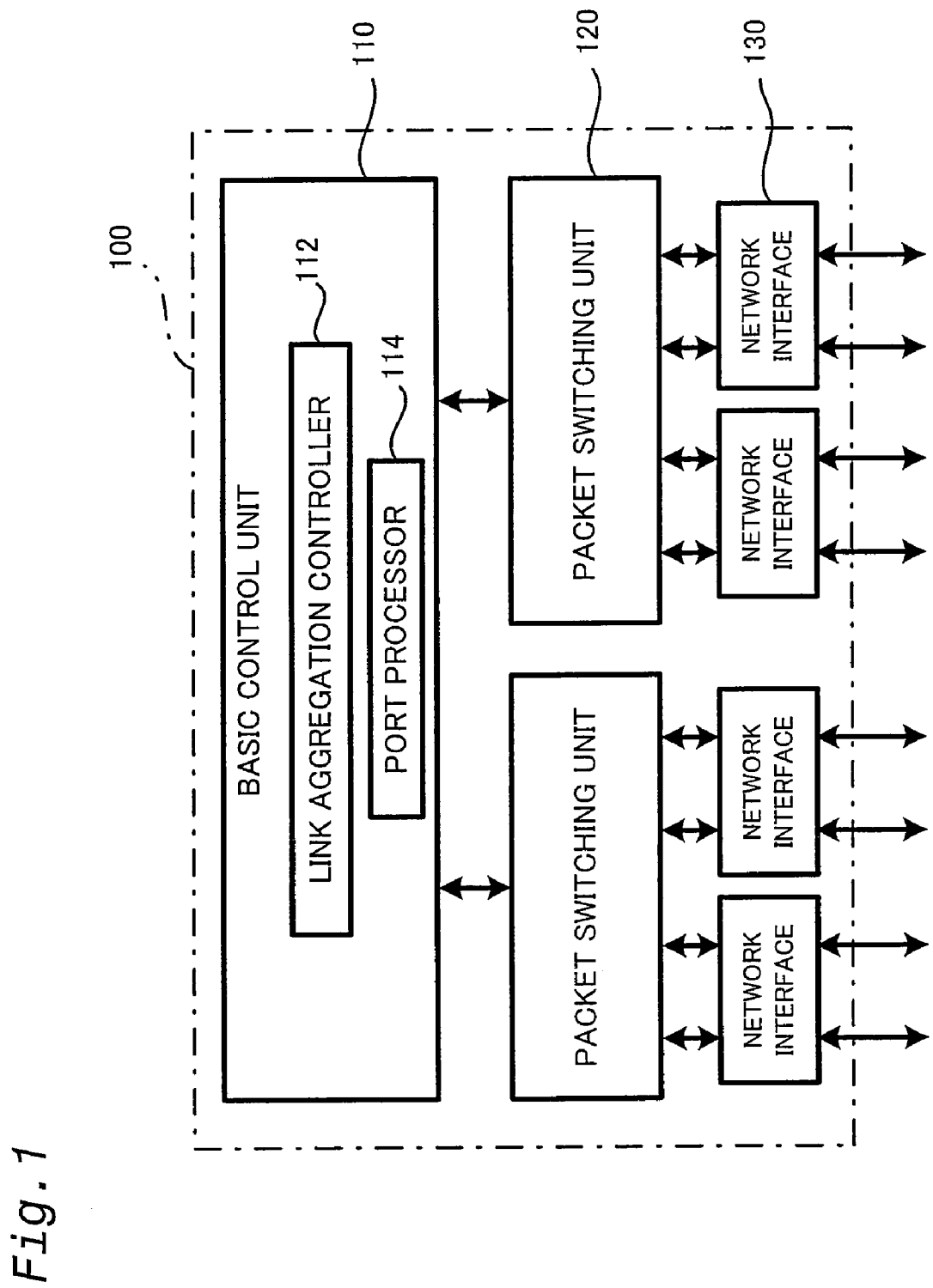
FIG. 1 is a block diagram showing the configuration of a switch 100 in one embodiment of the invention.

FIG. 1 is a block diagram showing the configuration of a switch 100 in one embodiment of the invention. As shown in FIG. 1, the switch 100 of this embodiment mainly includes a basic control unit 110 that manages the whole system of the switch 100 and executes routing protocol, packet switching units 120 that carry out packet relay on a second layer (data link layer) of the OSI reference model, and network interfaces 130 that carry out control on a first layer (physical layer). The basic control unit 110 has multiple CPUs and memories (not shown). The multiple CPUs execute programs stored in the memories to respectively function as a link aggregation controller 112 and a port processor 114. The network interfaces 130 are respectively connected to physical lines (for example, twisted pair cables or optical fibers) of Ethernet (registered trademark) or another adequate network via corresponding ports (not shown). The basic control unit 110 may be designed to additionally have the functions of the packet switching units 120. This modified design allows for omission of the packet switching units 120.

B. Connection

Figure 2:
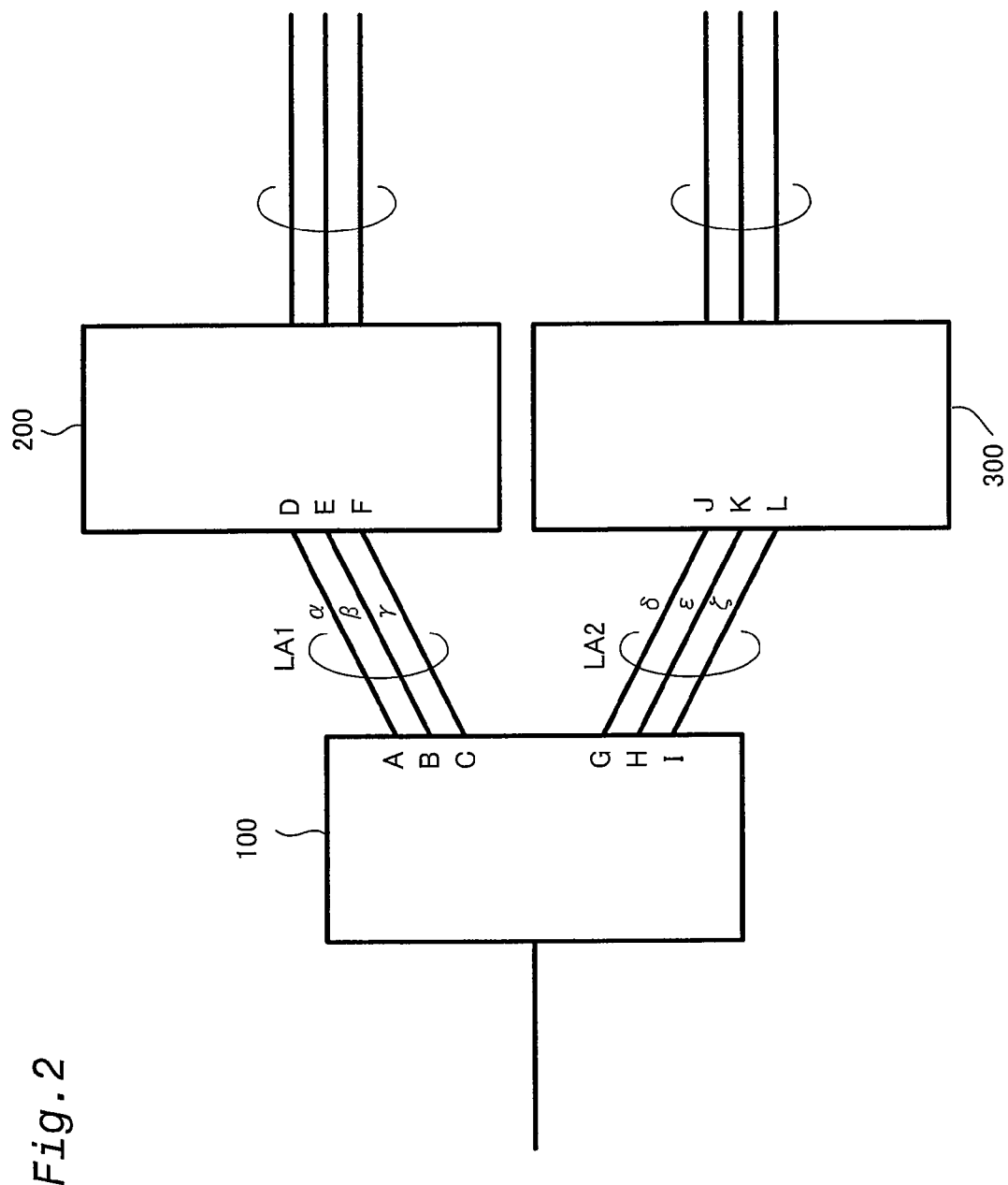
FIG. 2 shows a connection of the switch 100 shown in FIG. 1.

FIG. 2 shows a connection of the switch 100 shown in FIG. 1. In this illustrated example of FIG. 2, the switch 100 of the embodiment is connected with conventional switches 200 and 300, which are in conformity with IEEE (Institute of Electrical and Electronic Engineers) 802.3, by respective three links (multiple physical lines) α through γ and δ through ξ. Specifically, ports A through C of the switch 100 are connected to ports D through F of the switch 200 via the links α through γ, while ports G through I of the switch 100 are connected to ports J through L of the switch 300 via the links δ through ξ. The switches 100 through 300 respectively have ports other than those discussed above and are connected with non-illustrated other devices via other links.

The function of the link aggregation controller 112 establishes link aggregations LA1 and LA2 between the switch 100 and the switch 200 and between the switch 100 and the switch 300. The three links α through γ connecting the switch 100 with the switch 200 are thus aggregated to be regarded as one logic link. Similarly the three links δ through ξ connecting the switch 100 with the switch 300 are aggregated to be regarded as one logic link. The bandwidth of each logic link is the total of the bandwidths of the aggregated three links, as described previously. The arrangement of this embodiment thus desirably ensures the expanded bandwidth.

There are two link aggregations LA1 and LA2 established between the switch 100 and the switches 200 and 300. For example, the link aggregation LA1 established between the switches 100 and 200 may be used active, while the link aggregation LA2 established between the switches 100 and 300 may be used standby. This assures the redundancy of the network.

C. Drawbacks of Prior Art and Principles of Embodiment

In the case of the occurrence of any trouble or failure in one link γ among the aggregated three links α through γ in the active link aggregation LA1, the prior art technique continues communication in a degenerate mode via the remaining two normal links α and β, as described previously. In the degenerate mode, the decrease in number of working links from three to two naturally reduces the total bandwidth of the logic link to 2/3. The prior art technique adopts the degenerate mode in response to a trouble or failure arising in one of the aggregated links in the active link aggregation LA1 and undesirably continues communication via the link aggregation LA1 of the reduced bandwidth without a switchover to the standby link aggregation LA2. The switchover to the standby link aggregation LA2 is effectuated only when all the links in the active link aggregation LA1 are disabled.

In order to eliminate such drawback of the prior art, the technique of this embodiment stops data transmission via all the aggregated links and restrains the degenerate mode, in response to a trouble or failure arising in one of the aggregated links in the active link aggregation LA1. This allows for the switchover to the standby link aggregation LA2. Any of spanning tree algorithms and various routing protocols may be applied to the switchover to the standby link aggregation.

The switch 100 of this embodiment is designed to stop data transmission via all the aggregated links and restrain the degenerate mode, in response to a trouble or failure arising in one of the aggregated links in the active link aggregation LA1. The switch 200 as the opposite device is, however, the conventional switch in conformity with IEEE 802.3. The essential issue is thus how the switch 100 of the embodiment enables the conventional switch 200 as the opposite device to stop data transmission via all the aggregated links and restrain the degenerate mode.

In general, each pair of connecting ports in the two switches receive and send control frame signals via the link at regular intervals. The control frame signal includes a value '0' or '1' as a synchronization bit.

In the conventional switch in conformity with IEEE 802.3, when a port receives the synchronization bit '0', data transmission stops via the link connecting with the port. By taking advantage of this characteristic, the switch 100 of the embodiment is designed to send the synchronization bit '0' to the switch 200 as the opposite device via normal links, in response to a trouble or failure arising in one of the aggregated links in the active link aggregation LA1, while stopping data transmission via all the aggregated links in the switch 100. In response to reception of the synchronization bit '0', the switch 200 as the opposite device stops data transmission via all the aggregated links and restrains the degenerate mode.

D. Operations of Embodiment

In the switch 100 of this embodiment, the port processor 114 measures communication speeds of packets sent from and received by the respective ports, detects either full-duplex transmission or half-duplex transmission, and sends the results of the measurement and detection to the link aggregation controller 112. The link aggregation controller 112 establishes link aggregation as described above and manages the operating states of the respective ports involved in the link aggregation, based on the results of the measurement and detection sent from the port processor 114.

Figure 3:
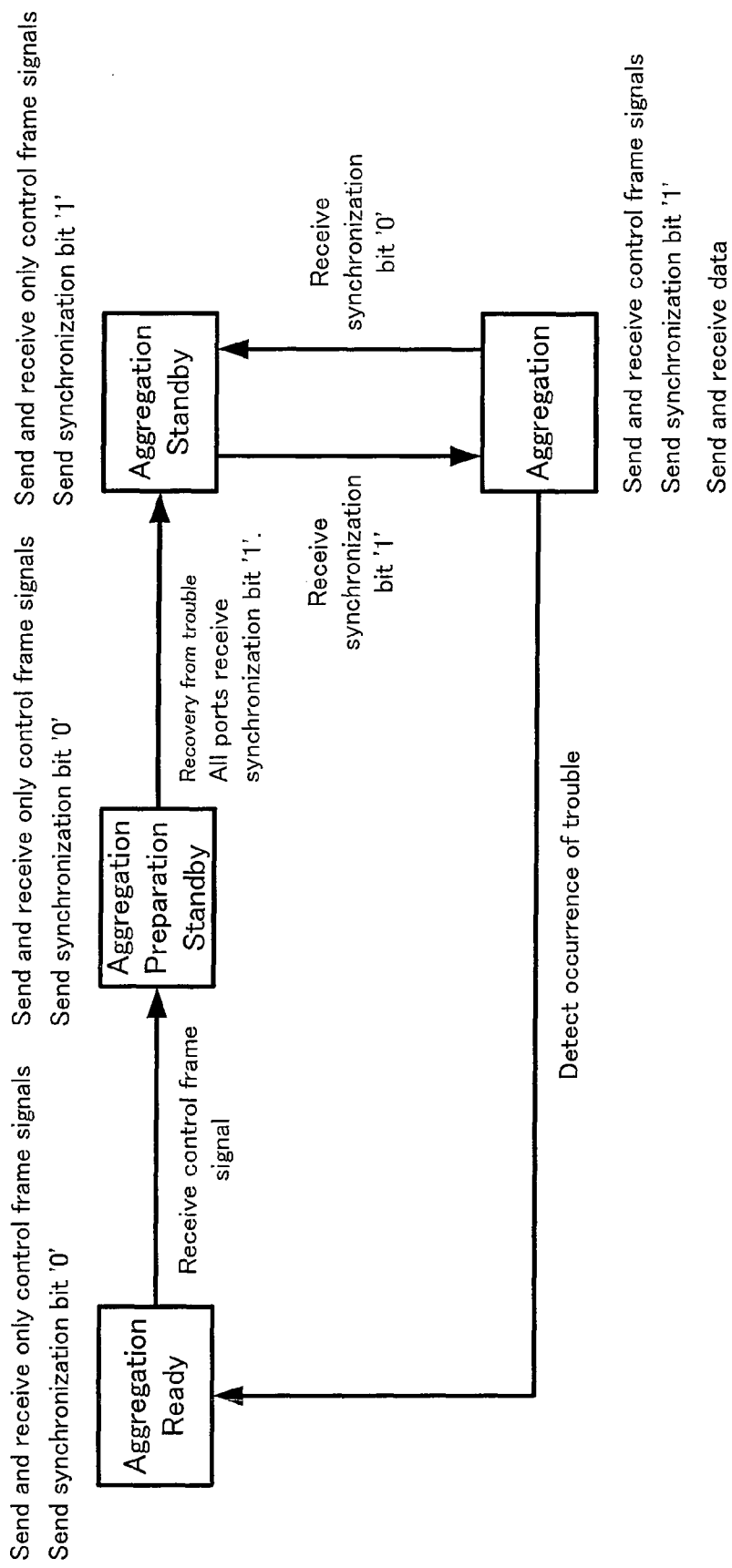
FIG. 3 is a state transition diagram showing transition of the operating state at each port in the switch 100 of the embodiment.

FIG. 3 is a state transition diagram showing transition of the operating state at each port in the switch 100 of the embodiment. Each port takes one of four available states, that is, 'aggregation ready' 'aggregation preparation standby', 'aggregation standby', and 'aggregation' as shown in FIG. 3, as its operating state and changes the operating state in response to a situational change.

Figure 4:
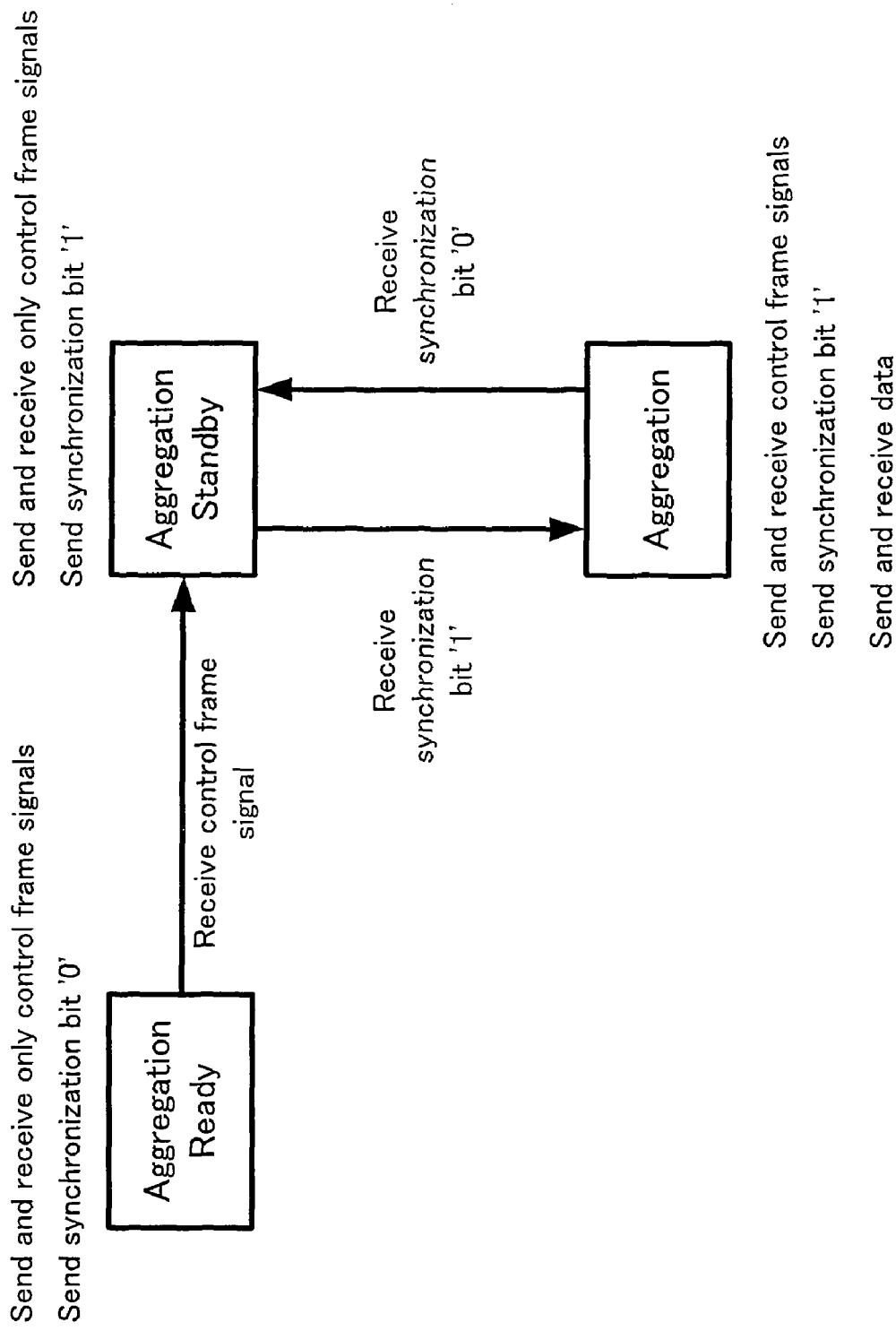
FIG. 4 is a state transition diagram showing transition of the operating state at each port in a conventional switch 200.

In the conventional switch 200 in conformity with IEEE 802.3, on the other hand, each port takes one of three available states shown in FIG. 4 as its operating state. FIG. 4 is a state transition diagram showing transition of the operating state at each port in the conventional switch 200. The conventional switch 200 takes one of only the three available states, 'aggregation ready', 'aggregation standby', and 'aggregation', and does not have the 'aggregation preparation standby' state.

Figure 5:
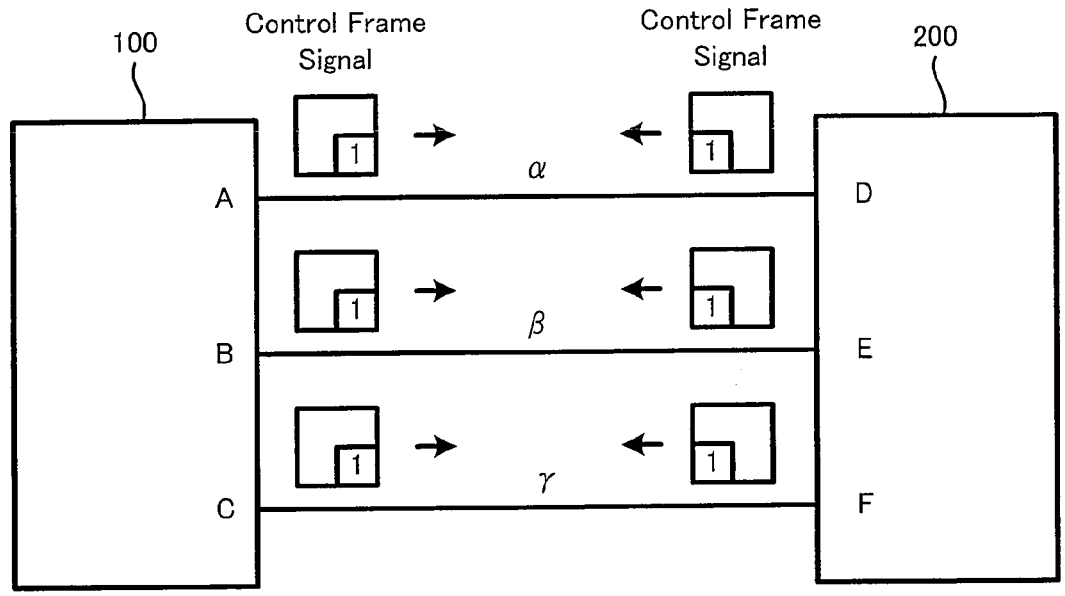
FIG. 5 shows communication by a link aggregation LA1 established between the switch 100 of the embodiment and the conventional switch 200 shown in FIG. 2.
Figure 6:
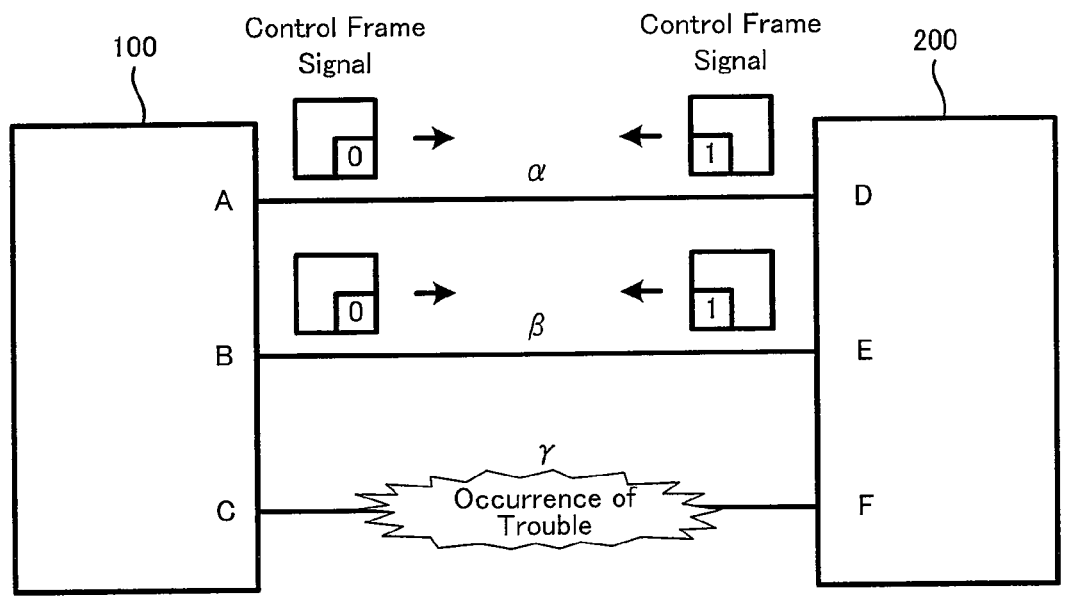
FIG. 6 shows communication by the link aggregation LA1 established between the switch 100 of the embodiment and the conventional switch 200 shown in FIG. 2.
Figure 7:
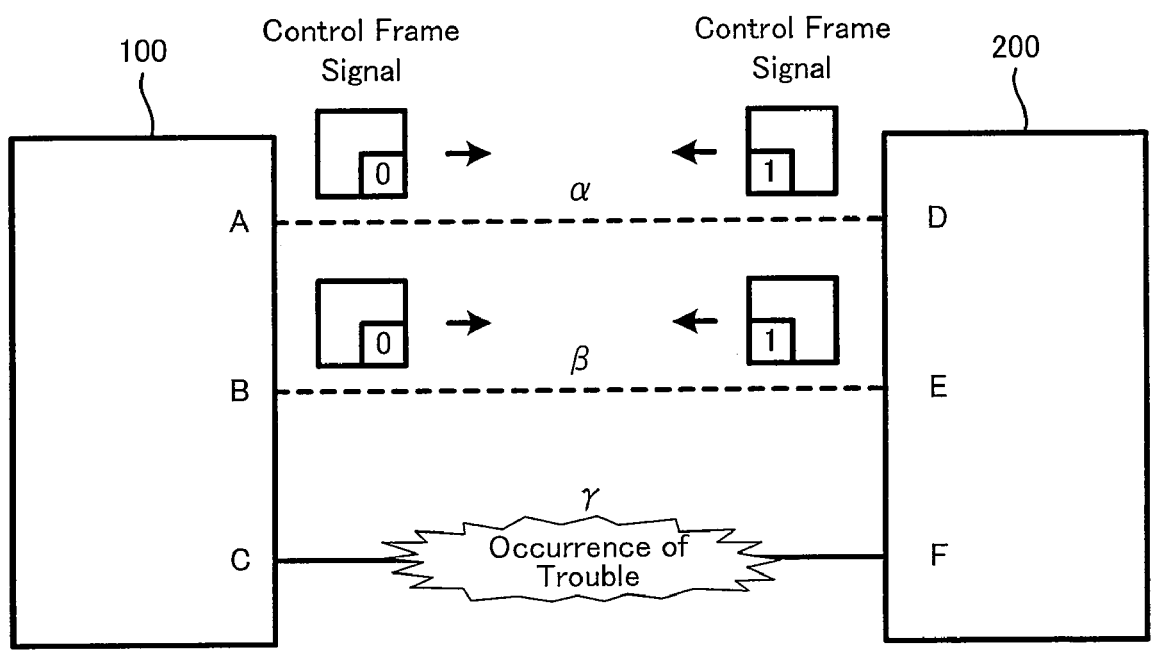
FIG. 7 shows communication by the link aggregation LA1 established between the switch 100 of the embodiment and the conventional switch 200 shown in FIG. 2.

FIGS. 5 through 7 show communication by the link aggregation LA1 established between the switch 100 of the embodiment and the conventional switch 200 shown in FIG. 2.

In the situation of FIG. 5, all the aggregated three links α through γ work normally. In this situation, the ports A through C in the switch 100 of the embodiment connecting with the links α through γ respectively take the 'aggregation' state as the operating state. The respective ports A through C in the 'aggregation' state accordingly carry out data transmission, as well as transmission of the control frame signals, via the links α through γ as shown in FIG. 3. The ports A through C send the control frame signals including the synchronization bit '1'.

In the conventional switch 200 as the opposite device, the ports D through F connecting with the links α through γ respectively take the 'aggregation' state as the operating state. The respective ports D through F in the 'aggregation' state accordingly carry out data transmission, as well as transmission of the control frame signals, via the links α through γ as shown in FIG. 4. The ports D through F send the control frame signals including the synchronization bit '1'.

In FIG. 5, each larger square drawn in the vicinity of each of the links α through γ represents a control frame signal, and each smaller square drawn inside the larger square represents a synchronization bit included in the control frame signal. Such representation is also adopted in FIGS. 6 and 7.

In the situation of FIG. 5, the synchronization bit '1' is included in the control frame signals sent from the respective ports A through C in the switch 100 of the embodiment and from the respective ports D through F in the conventional switch 200.

In the situation of FIG. 6, some failure or trouble arises in the link γ among the aggregated three links α through γ. The cause of the trouble may be a break of a physical line making the link (for example, a bent of an optical cable), a failure at a joint (for example, a variation in resistance by aging deterioration), or a setting error.

In the switch 100 of the embodiment, the port processor 114 measures the communication speeds of packets sent from and received by the respective ports and sends the results of the measurement to the link aggregation controller 112. The link aggregation controller 112 analyzes the received results of the measurement and detects the occurrence of a trouble or failure in the link γ connecting with the port C, for example, when the observed communication speed of packets at the port C is significantly lower than the other ports A and B. The occurrence of a trouble or failure may be detected according to another criterion, for example, detection of half-duplex transmission or full-duplex transmission. The criterion to detect the occurrence of a trouble or failure is not restricted to the results of such measurement or detection sent from the port processor 114 but may be the results of such measurement or detection by the link aggregation controller 112 or the results of such measurement or detection sent from another processor.

In response to detection of the occurrence of a trouble or failure in the link γ, the link aggregation controller 112 changes the operating state from the 'aggregation' state to the 'aggregation ready' state as shown in FIG. 3 at the ports A and B connecting with the normal links α and β. The ports A and B in the 'aggregation ready' state stop data transmission and then carry out transmission of only the control frame signals via the links α and β. The ports A and B send the control frame signals including the synchronization bit '0'.

In the situation of FIG. 6, the control frame signals sent from the ports A and B in the switch 100 include the synchronization bit '0'.

In the conventional switch 200 as the opposite device, the ports D and E receive the control frame signals, which are sent from the switch 100 via the links α and β and include the synchronization bit '0'. In response to reception of the synchronization bit '0' included in the control frame signals, the operating state changes from the 'aggregation' state to the 'aggregation standby' state at the ports D and E as shown in FIG. 4. The ports D and E in the 'aggregation standby' state stop data transmission and then carry out transmission of only the control frame signals via the links α and β. The ports D and E, however, still send the control frame signals including the synchronization bit '1'.

In response to reception of the control frame signals sent from the switch 200 via the links α and β, the ports A and B in the switch 100 change the operating state from the 'aggregation ready' state to the 'aggregation preparation standby' state as shown in FIG. 3. The ports A and B in the 'aggregation preparation standby' state continuously carry out transmission of only the control frame signals via the links α and β and send the control frame signals including the synchronization bit '0'. The 'aggregation preparation standby' state continues until the trouble is fixed in the link γ and all the ports A through C receive the synchronization bit '1'.

The arrangement of the switch 100 accordingly stops data transmission at the ports D and E in the conventional switch 200 as the opposite device, as well as data transmission at the ports A and B in the switch 100. Namely the arrangement stops data transmission via all the aggregated normal links α and β in the link aggregation LA1 and restrains the degenerate mode as shown in FIG. 7. The link aggregation LA1 is accordingly inactivated.

This disables all the links included in the active link aggregation LA1 and allows for a switchover from the active link aggregation LA1 to the standby link aggregation L2, thus effectively assuring the redundancy of the network.

When the trouble is fixed in the link γ, the link aggregation controller 112 in the switch 100 of the embodiment detects recovery from the trouble in the link γ, based on the results of the measurement or detection sent from the port processor 114. Even after detection of the recovery from the trouble in the link γ, the ports A and B are kept in the 'aggregation preparation standby' state unless all the ports A through C receive the synchronization bit '1', as described above.

In response to recovery from the trouble in the link γ, the operating state changes to the 'aggregation ready' state at the port C in the switch 100 of the embodiment connecting with the link γ. The port C in the 'aggregation ready' state carries out transmission of only the control frame signal via the link γ and sends the control frame signal including the synchronization bit '0', as shown in FIG. 3. In the conventional switch 200 as the opposite device, on the other hand, the operating state similarly changes to the 'aggregation ready' state at the corresponding port F connecting with the link γ. The port F in the 'aggregation ready' state carries out transmission of only the control frame signal via the link γ and sends the control frame signal including the synchronization bit '0', as shown in FIG. 4.

In response to reception of the control frame signal sent from the switch 200 via the link γ, the operating state changes from the 'aggregation ready' state to the 'aggregation preparation standby' state at the port C in the switch 100. In the switch 100 of the embodiment, all the ports A through C involved in the link aggregation LA1 are accordingly set in the 'aggregation preparation standby' state as the operating state.

In response to reception of the control frame signal sent from the switch 100 via the link γ, the operating state changes from the 'aggregation ready' state to the 'aggregation standby' state at the port F in the conventional switch 200 as the opposite device. The port F in the 'aggregation standby' state continuously carries out transmission of only the control frame signal via the link γ but sends the control frame signal including the synchronization bit '1'.

In the conventional switch 200, the ports D and E are kept in the 'aggregation standby' state and send the control frame signals including the synchronization bit '1' via the links α and β. The start of transmission of the synchronization bit '1' from the port F thus enables all the ports A through C in the switch 100 connecting with the links α through γ to receive the synchronization bit '1'.

The value '1' of the synchronization bit in this state is equivalent to the 'value representing the start standby state of data transmission' in the claims.

The operating state accordingly changes from the 'aggregation preparation standby' state to the 'aggregation standby' state at the ports A through C. These ports A through C continuously carry out transmission of only the control frame signal via the links α through γ but send the control frame signals including the synchronization bit '1'.

In the conventional switch 200 as the opposite device, the ports D through F receive the control frame signals, which are sent from the switch 100 via the links α through γ and include the synchronization bit '1'. In response to reception of the synchronization bit '1' included in the control frame signals, the operating state changes from the 'aggregation standby' state to the 'aggregation' state at the ports D through F as shown in FIG. 4. The ports D through F in the 'aggregation' state start data transmission via the links α through γ, while continuously carrying out transmission of the control frame signals and sending the control frame signals including the synchronization bit '1'.

In the switch 100 of the embodiment, similarly the ports A through C receive the control frame signals, which are sent from the switch 200 via the links α through γ and include the synchronization bit '1'. The value '1' of the synchronization bit in this state is equivalent to the 'value representing either of the start standby state and the start of data transmission' in the claims.

In response to reception of the synchronization bit '1', the operating state changes from the 'aggregation standby' state to the 'aggregation' state at the ports A through C as shown in FIG. 3. These ports A through C in the 'aggregation' state start data transmission via the links α through γ, while continuously carrying out transmission of the control frame signals and sending the control frame signals including the synchronization bit '1'.

The start of data transmission at the ports A through C in the switch 100 initiates data transmission at the ports D through F in the conventional switch 200 as the opposite device. Data transmission via all the aggregated links α through γ in the link aggregation LA1 accordingly resumes to reactivate the link aggregation LA1, as in the situation of FIG. 5.

In the state transition diagram of FIG. 3, recovery from the trouble is set as part of the conditions for the transition of the operating state from the 'aggregation preparation standby' state to the 'aggregation standby' state. Here the terminology 'recovery from the trouble' includes no occurrence of any trouble or failure. No occurrence of any trouble or failure is thus regarded as the recovery from the trouble. On condition that all the ports have received the synchronization bit '1', the operating state is changed from the 'aggregation preparation standby' state to the 'aggregation standby' state.

E. Effects of Embodiment

As described above, in response to detection of the occurrence of a trouble or failure in at least one of the aggregated multiple links in the active link aggregation LA1, the switch 100 of the embodiment changes the operating state from the 'aggregation' state to the 'aggregation ready' state and stops data transmission at the ports connecting with the normal links. The switch 100 of the embodiment simultaneously sends the control frame signal including the synchronization bit '0' to the opposite device to stop data transmission at the ports of the opposite device connecting with the normal links. This arrangement effectively restrains the degenerate mode and stops data transmission via all the aggregated links in the active link aggregation LA1. Namely all the links are disabled in the active link aggregation LA1. This allows for a switchover from the active link aggregation LA1 to the standby link aggregation LA2, thus effectively ensuring the redundancy of the network.

In the switch 100 of the embodiment, the conditions of changing the operating state from the 'aggregation preparation standby' state to the 'aggregation standby' state are that the trouble has been fixed and that all the ports have received the synchronization bit '1' as shown in FIG. 3. This leads to additional effects. The prior art technique carries out one-by-one aggregation of multiple target links and sequentially starts data transmission via the aggregated link, prior to completion of the whole link aggregation. In the case where any of the multiple target links fails in establishment of the link aggregation after the sequential start of the data transmission, the connection has undesirably been established with the reduced bandwidth. The technique of the embodiment, on the other hand, sets reception of the synchronization bit '1' at all the ports as part of the conditions of the state transition. Namely the operating state changes to the 'aggregation standby' state at all the ports in the switch 100 of the embodiment after confirmation that no failure or trouble arises in the opposite device in establishment of the link aggregation and that the operating state has been changed to the 'aggregation standby' state at all the ports in the opposite device. The arrangement of this embodiment starts data transmission only after confirmation of successful aggregation of all the multiple target links and thereby advantageously ensures connection with a desired bandwidth.

F. Modifications

The embodiment discussed above is to be considered in all aspects as illustrative and not restrictive. There may be many modifications, changes, and alterations without departing from the scope or spirit of the main characteristics of the present invention.

In the embodiment discussed above, the conditions of changing the operating state from the 'aggregation preparation standby' state to the 'aggregation standby' state are that the trouble has been fixed and that all the ports have received the synchronization bit '1' as shown in FIG. 3. Only the recovery from the trouble may be set as the condition of the state transition.

Transition of the operating state to the 'aggregation standby' state after confirmation of the recovery from the trouble does not cause any significant problem, as long as no further failure arises in the opposite device.

Although each link aggregation consists of three links in the structure of the above embodiment, the link aggregation may consist of only two links or four or a greater number of links.

The above embodiment regards application of the invention to the switch as one of network relay devices. The technique of the invention is naturally not restricted to the switches but may be applicable to other network relay devices like routers.

The above embodiment regards the relay on the second layer (data link layer) in the OSI reference model. The technique of the invention is, however, not restricted to the relay on the second layer (data link layer) but may be applied to relay on another layer, for example, on a third layer (network layer).

Finally, the present application claims the priority based on Japanese Patent Application No. 2004-163389 filed on Jun. 1, 2004, which is herein incorporated by reference.

What is claimed is:

1. A network relay device that carries out data transmission to and from an opposite device, the network relay device comprising:
multiple ports connecting with corresponding multiple ports of the opposite device via multiple-physical lines; and
a link aggregation control module that aggregates the multiple physical lines to establish a link aggregation, which is regarded as one logic link, and carries out transmission of a control frame signal including a synchronization bit, as well as data transmission, at each port via the physical lines,
in response to detection of occurrence of a trouble in communication of at least one of the aggregated multiple physical lines, the link aggregation control module causing all ports that connect with a normal physical line without the trouble among the multiple ports to stop the data transmission and send the control frame signal including the synchronization bit set equal to a first value,
where the first value functions to stop the data transmission at corresponding ports of the opposite device connecting with the normal physical lines.

2. A network relay device in accordance with claim 1, wherein the link aggregation control module causes at least the port connecting with the normal physical line to send the control frame signal including the synchronization bit set equal to a second value, which is different from the first value, in the case of recovery of communication of the at least one physical line from the trouble,
where the second value functions to start the data transmission at the corresponding port of the opposite device connecting with the normal link.

3. A network relay device in accordance with claim 2, wherein the link aggregation control module starts the data transmission at the port that has sent the control frame signal including the synchronization bit set equal to the second value, in response to reception of the control frame signal including the synchronization bit, which is set equal to a value representing either of a start standby state and a start of the data transmission, from the corresponding port of the opposite device.

4. A network relay device in accordance with claim 1, wherein the link aggregation control module causes at least the port connecting with the normal physical line to send the control frame signal including the synchronization bit set equal to a second value, which is different from the first value, when the trouble in communication of the at least one physical line has been fixed and when all the multiple ports have received the control frame signal including the synchronization bit, which is set equal to a value representing a start standby state of the data transmission, from respective corresponding ports of the opposite device,
where the second value functions to start the data transmission at the corresponding port of the opposite device connecting with the normal link.

5. A network relay device in accordance with claim 4, wherein the link aggregation control module starts the data transmission at the port that has sent the control frame signal including the synchronization bit set equal to the second value, in response to reception of the control frame signal including the synchronization bit, which is set equal to a value representing either of a start standby state and a start of the data transmission, from the corresponding port of the opposite device.

6. A network relay device in accordance with claim 1, wherein the opposite device is a network relay device in conformity with IEEE (Institute of Electrical and Electronic Engineers) 802.3.

7. A network relay device in accordance with claim 1, wherein the network relay device is either one of a switch and a router.

8. A network relay device that carries out data transmission to and from an opposite device, the network relay device comprising:
multiple ports connecting with corresponding multiple ports of the opposite device via multiple physical lines; and
a link aggregation control module that aggregates the multiple physical lines to establish a link aggregation, which is regarded as one logic link, and carries out transmission of a control frame signal including a synchronization bit, as well as data transmission, at each port via the physical lines,
the link aggregation control module allowing each of the multiple ports to take one of first through fourth states as an operating state,
the link aggregation control module causing the port set in the first state to carry out data transmission, as well as transmission of the control frame signal, where the control frame signal sent from the port in the first state includes the synchronization bit set equal to a value '1', the link aggregation control module causing the port set in either of the second state and the third state to carry out transmission of only the control frame signal, where the control frame signal sent from the port in either of the second state and the third state includes the synchronization bit set equal to a value '0', the link aggregation control module causing the port set in the fourth state to carry out transmission of only the control frame signal, where the control frame signal sent from the port in the fourth state includes the synchronization bit set equal to the value '1', in response to detection of occurrence of a trouble in communication of physical line other than a physical line connecting with the port in the first state, among the aggregated multiple physical lines, the link aggregation control module allowing for a transition of the operating state of all ports that connect with normal physical lines without the trouble from the first state to the second state the link aggregation control module allowing for a transition of the operating state from the second state to the third state, when the port in the second state receives the control frame signal from a corresponding port of the opposite device, the link aggregation control module allowing for a transition of the operating state from the third state to the fourth state, in response to recovery of communication of the physical line from the trouble, the link aggregation control module allowing for a transition of the operating state from the fourth state to the first state, when the port in the fourth state receives the control frame signal including the synchronization bit set equal to 1 from a corresponding port of the opposite device, the link aggregation control module allowing for a transition of the operating state from the first state to the fourth state, when the port in the first state receives the control frame signal including the synchronization bit set equal to 0 from a corresponding port of the opposite device.

9. A network relay device in accordance with claim 8, wherein the link aggregation control module allows for the transition of the operating state from the third state to the fourth state, when the trouble has been fixed in communication of the physical line and when all the multiple ports have received the control frame signal including the synchronization bit set equal to 1 from respective corresponding ports of the opposite device.

10. A network relay device in accordance with claim 8, wherein the opposite device is a network relay device in conformity with IEEE (Institute of Electrical and Electronic Engineers) 802.3.

11. A network relay device in accordance with claim 8, wherein the network relay device is either one of a switch and a router.

12. A control method of controlling a network relay device, the network relay device having multiple ports that connect with corresponding multiple ports of an opposite device via multiple physical lines and carrying out data transmission to and from the opposite device, the control method comprising the steps of:
(a) aggregating the multiple physical lines to establish a link aggregation, which is regarded as one logic link, and carrying out transmission of a control frame signal including a synchronization bit, as well as data transmission, at each port via the physical line; and
(b) in response to detection of occurrence of a trouble in communication of at least one of the aggregated multiple physical lines, causing all ports that connect with normal physical lines without the trouble among the multiple ports to stop the data transmission and send the control frame signal including the synchronization bit set equal to a preset value, where the preset value functions to stop the data transmission at corresponding ports of the opposite device connecting with the normal physical lines.

* * * * *